US008503291B1

(12) United States Patent
Lee et al.

(10) Patent No.: US 8,503,291 B1
(45) Date of Patent: Aug. 6, 2013

(54) SYSTEMS AND METHODS FOR DIRECTING A BEAM TOWARDS A DEVICE IN THE PRESENCE OF INTERFERENCE BASED ON RECIPROCITY

(75) Inventors: Jungwon Lee, Cupertino, CA (US); Jihwan P. Choi, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 399 days.

(21) Appl. No.: 12/818,430

(22) Filed: Jun. 18, 2010

Related U.S. Application Data

(60) Provisional application No. 61/233,785, filed on Aug. 13, 2009.

(51) Int. Cl.
  *G01R 31/08* (2006.01)
  *H04Q 7/00* (2006.01)

(52) U.S. Cl.
  USPC ........... 370/225; 370/329; 370/508; 370/208; 370/252; 370/503; 375/232; 375/346; 375/267; 375/347; 455/69; 455/424

(58) Field of Classification Search
  USPC ................. 370/225, 329, 508, 208, 334, 252, 370/516, 503, 278; 375/232, 346, 267, 347, 375/219, 240.24, 316; 455/69, 424
  See application file for complete search history.

(56) References Cited

U.S. PATENT DOCUMENTS

| | | | | |
|---|---|---|---|---|
| 6,574,293 | B1 * | 6/2003 | Khayrallah et al. | 375/347 |
| 7,747,250 | B2 * | 6/2010 | Larsson et al. | 455/424 |
| 2007/0183371 | A1 * | 8/2007 | McCoy | 370/334 |
| 2007/0258541 | A1 * | 11/2007 | Yamaura | 375/267 |
| 2010/0254300 | A1 * | 10/2010 | Gulasekaran et al. | 370/315 |
| 2010/0254325 | A1 * | 10/2010 | Narasimhan et al. | 370/329 |
| 2010/0255790 | A1 * | 10/2010 | Farajidana et al. | 455/69 |

OTHER PUBLICATIONS

Chen, C. et al., "Interference Mitigation DG Harmonized Text Proposal", IEEE C802.16m-09/1540r9, Jul. 15, 2009. pp. 1-21.
S. Sesia, I. Toufik and M. Baker, "LTE-The UMTS Long Term Evolution From Theory to Practice", West Sussex, UK: Wiley, 2009, p. 572-583.

* cited by examiner

*Primary Examiner* — Andrew Chriss
*Assistant Examiner* — Jamal Javaid

(57) ABSTRACT

Methods and apparatus are provided for directing a beam towards a receiving device in the presence of interference. A beam transmitted by a transmission source is received at a receiving device. The received beam is affected by an interference signal from an interfering source. The receiving device computes a covariance matrix that represents a channel estimate associated with the interfering source. The receiving device modifies a predetermined sounding signal based on the covariance matrix for transmission to the transmission source. The receiving device causes the transmission source to estimate an equivalent channel matrix based on the predetermined sounding signal and the modified predetermined sounding signal. The equivalent channel matrix represents the channel estimate associated with the interfering source and a channel estimate associated with the transmission source.

18 Claims, 5 Drawing Sheets

500

510
Receive, at a Receiving Device, a Beam Transmitted by a Transmission Source, the Received Beam Being Affected by an Interference Signal from an Interfering Source

520
Compute at the Receiving Device, a Covariance Matrix that Represents a Channel Estimate Associated with the Interfering Source

530
Modify, at the Receiving Device, a Predetermined Sounding Signal Based on the Covariance Matrix for Transmission to the Transmission Source

540
Cause the Transmission Source to Estimate an Equivalent Channel Matrix Based on the Predetermined Sounding Signal and the Modified Predetermined Sounding Signal, Wherein the Equivalent Channel Matrix Represents the Channel Estimate Associated with the Interfering Source and a Channel Estimate Associated with the Transmission Source

FIG. 5

SYSTEMS AND METHODS FOR DIRECTING A BEAM TOWARDS A DEVICE IN THE PRESENCE OF INTERFERENCE BASED ON RECIPROCITY

CROSS REFERENCE TO RELATED APPLICATION

This disclosure claims the benefit of U.S. Provisional Application No. 61/233,785, filed Aug. 13, 2009, which is hereby incorporated by reference herein in its entirety.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted as prior art against the present disclosure.

The present disclosure is directed to methods and apparatus for directing a beam towards a receiving device (e.g., beam-forming), and more particularly to performing beam-forming in the presence of interference based on channel reciprocity.

Beam-forming is a signal processing technique used in systems for directional signal transmission or reception. The spatial selectivity may be achieved by using adaptive or fixed receive/transmit beam patterns. Beam-forming takes advantage of constructive/destructive wave interference to change the direction of the beam. As defined herein, a beam is the electromagnetic wave, carrying data to a receiver, which is formed by the (constructive/destructive) interference pattern of two or more waves transmitted by one or more antennas.

Traditionally, a receiving device receives a beam from the transmission source and computes a channel matrix for the intended channel and a channel matrix corresponding to interference caused by interference source signals and noise. In some scenarios, the receiving device computes an equivalent channel matrix that corresponds to the intended channel and the interference. The receiver in both scenarios transmits the matrices back to the transmission source for modifying the shape of the transmitted beam. Although these mechanisms for performing beam-forming are effective, these systems are inefficient in requiring the direct feedback of the channel matrices to the transmission source.

SUMMARY

In accordance with the principles of the present disclosure, methods and apparatus are provided for directing a beam towards a receiving device (e.g., beam-forming) in the presence of interference based on channel reciprocity, and more particularly to estimating, at a transmission source, an equivalent channel matrix for the communications channel from a modified predetermined sounding signal received from a receiving device.

In some embodiments, a beam transmitted by a transmission source is received at a receiving device. The received beam is affected by an interference signal from an interfering source. The receiving device computes a covariance matrix that represents a channel estimate associated with the interfering source. The receiving device modifies a predetermined sounding signal based on the covariance matrix for transmission to the transmission source. The receiving device causes the transmission source to estimate an equivalent channel matrix based on the predetermined sounding signal and the modified predetermined sounding signal. The equivalent channel matrix represents the channel estimate associated with the interfering source and a channel estimate associated with the transmission source.

In some embodiments, the estimated equivalent channel matrix corresponds to the channel matrix associated with the transmission source multiplied by a square root of an inverse of the covariance matrix. In some implementations, the estimated equivalent channel matrix causes interference caused by the interference signal to become white noise.

In some embodiments, the predetermined sounding signal is known to the transmission source and the receiving device. In some implementations, the predetermined sounding signal is modified by precoding data associated with the predetermined sounding signal by applying a singular value decomposition algorithm or a Tomlinson-Harashima Precoding algorithm to the data associated with the predetermined sounding signal. In some implementations, the predetermined sounding signal is modified by multiplying the predetermined sounding signal by a square root of an inverse of the covariance matrix. In some implementations, a precoding matrix corresponding to the covariance matrix is provided. The predetermined sounding signal is transmitted to the transmission source using one or more antennas of the receiving device. Each of the one or more antennas applies a weight to the predetermined sounding signal corresponding to different columns of the precoding matrix. In some implementations, each of the precoding matrix columns is non-zero and the predetermined sounding signal is transmitted by the one or more antennas substantially simultaneously.

In some embodiments, the modified predetermined sounding signal is transmitted to the transmission source through a backward channel. The transmission source estimates the equivalent channel matrix for the backward channel based on the modified predetermined sounding signal received through the backward channel and the predetermined sounding signal. In some implementations, the receiving device computes the covariance matrix by computing a covariance matrix for the forward channel based on a forward channel estimate associated with the interfering source. The predetermined sounding signal is modified based on the forward channel covariance matrix. The transmission source is caused to compute an equivalent channel matrix for the forward channel based on reciprocity of the backward channel equivalent channel matrix.

In some embodiments, the transmission source modifies characteristics of the beam by precoding data based on the equivalent channel matrix estimated by the transmission source. In some implementations, the transmission source estimates the equivalent channel matrix without receiving any channel matrix from the receiving device.

BRIEF DESCRIPTION OF THE DRAWINGS

The above and other features of the present disclosure, its nature and various advantages will be more apparent upon consideration of the following detailed description, taken in conjunction with the accompanying drawings in which:

FIG. 5 illustrates a process for directing a beam towards a receiving device in the presence of interference based on channel reciprocity in accordance with an embodiment of the present disclosure.

DETAILED DESCRIPTION

This disclosure generally relates to directing a beam (e.g., beam-forming) in the presence of interference based on channel reciprocity. For illustrative purposes, this disclosure is described in the context of a cellular system with an intended transmission source (e.g., the base station that is meant to communicate with a receiving device mobile device) and one interfering source (e.g., a different base station or another source generating interference signals). It should be understood, however, that this disclosure is applicable to any number of interfering sources in any multi-transmission source system (e.g., WiMAX, BLUETOOTH and/or 3GPP LTE).

Multiple Input Multiple Output (MIMO) systems may be used to improve link reliability and throughput in different environments. In cellular systems, applying beam-forming may further improve the MIMO system performance by directing the beam in the appropriate direction to a particular device (e.g., from the base station to the mobile station). Directing the beam to the receiving device may increase the received signal power and reduce any interference power that may be present. For example, while the intended receiving device receives a high power signal (e.g., high signal-to-interference-and-noise-ratio (SINR)) other devices may receive the signal with a lower power (e.g., low SINR) that may even appear as noise and may therefore disregard the signal.

The receiving device may compute estimates of channels associated with the intended transmission source and the interfering sources. The receiving device provides the computed estimates to the intended transmission source as a feedback signal. The transmission source uses the feedback signal information to modify characteristics of the beam and thereby the shape of the beam to compensate for any interference patterns. Direct channel estimates feedback systems and their functionalities are described in greater detail in Lee et al. U.S. patent application Ser. No. 12/363,047, filed Jan. 30, 2009, which is hereby incorporated by reference herein in its entirety.

As referred to herein, the term beamformer identifies the originator of the beam (e.g., the intended base station communicating with the mobile station) and the term beamformee identifies the receiving device (e.g., a mobile station) which receives the beam from the beamformer with interference patterns caused by other transmission sources (referred to as interfering sources).

Figure 1:
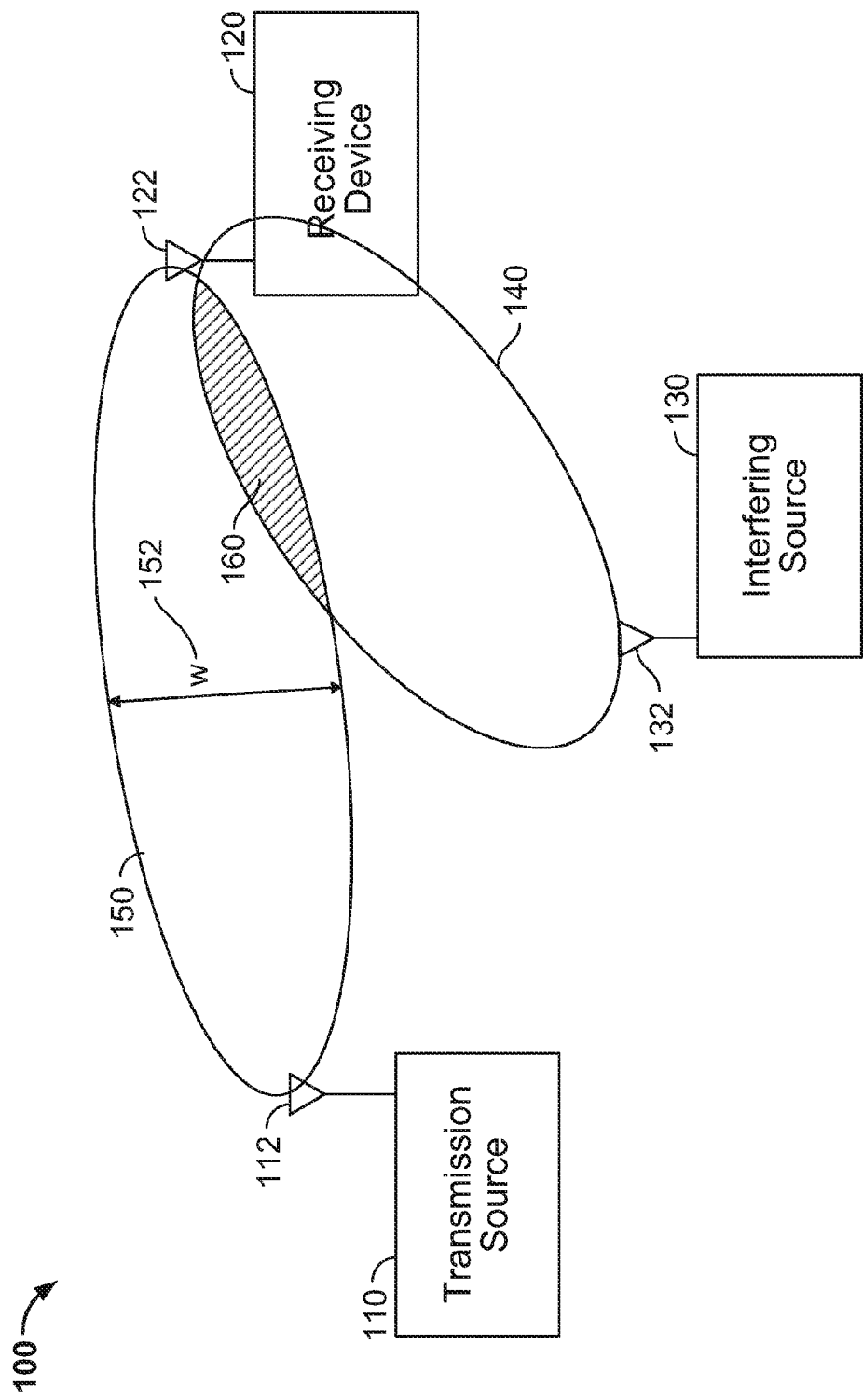
FIGS. 1 and 2 are diagrams of illustrative beam-forming systems in accordance with an embodiment of the present disclosure.

FIG. 1 is a diagram of an illustrative beam-forming system 100 in accordance with an embodiment of the present disclosure. Beam-forming system 100 may include transmission source 110, a receiving device 120 and an interfering source 130. Transmission source 110 (i.e., beamformer) may be a base station in a cellular environment that provides and receives data to/from receiving device 120.

Transmission source 110 may include any number of antennas 112 (typically two or more) to transmit a signal towards a particular device. For example, processing circuitry (not shown) within transmission source 110 may be used to modify characteristics of signals provided to antennas 112 to shape the transmission of the signals and thereby the beam in a particular way. More specifically, when transmitting, a beamformer with multiple antennas 112 may control the phase and relative amplitude of the signal at each antenna of the transmitter in order to create a pattern of constructive and destructive interference in the wavefront generated by each antenna. This pattern of constructive and destructive interference shapes the beam (i.e., the wave) formed by the combination of the waves from each antenna and points the beam in a particular direction (e.g., towards receiving device 120).

More specifically, transmission source 110 may generate a beam 150 using antennas 112. Instead of being circular, beam 150 may have an elliptical shape which is more focused at one portion than other portions. The shape of beam 150 may have a minor axis width 152. In general, it is desirable to make the beam width as narrow as possible in order to have the beam directed towards a desired receiver. On the other hand, there is a limit to how narrow a beam width can be made because the beam width is a function of the number of antennas and the antenna configuration. Usually, the larger the antenna separation, the narrower the resulting beam width. However, because the transmitter is inherently limited in physical space, the antennas can only be positioned a certain distance apart and thereby may have a maximum limit to the narrowness of the beam width the antennas can form.

Receiving device 120 may be a cellular phone, PDA, mobile device, laptop, computing device, or any other suitable device used for communicating with a transmission source 110. Receiving device 120 may have one or more antennas 122 for receiving beam 150. Depending on the location of receiving device 120, there may exist one or more interfering sources 130 that generate signals that interfere with the signals intended to be received by receiving device 120. For example, multiple base stations may generate signals that overlap a particular region in which a mobile device is situated. The mobile device may communicate with one of the base stations and the other base stations that have signals reaching the particular region may interfere with the signals of the base station with which the mobile device communicates.

In particular, interfering source 130 may have one or more antennas 132. Interfering source 130 may be 0.25 another base station, transmission source, noise, mobile device or any other source that may transmit signals that overlap with the signals transmitted by transmission source 110. Interfering source 130 may generate a beam 140 that may overlap with beam 150 over some region 160. The shape of beam 150 may change as a result of the overlap in region 160 with interfering signals or beam 140 to be different than what was intended by transmission source 110. The signal-to-interference-and-noise-ratio (SINR) of beam 150 may therefore be reduced due to the interference caused by interfering signals or beam 140.

It should be understood that although one interfering source 130 is drawn, any number of interfering sources may be present. Each interfering source may generate interfering signals that may affect the shape of beam 150 intended by transmission source 110. In particular, transmission source 110 may not have the channel characteristics of signals generated by each interfering source 130 that may interfere with beam 150 and accordingly may not be able to appropriately shape and direct beam 150 towards receiving device 120.

In accordance with an embodiment of the present disclosure, receiving device 120 may compute the channel estimate associated with transmission source 110 and interfering source 130. In some implementations, receiving device 120 may compute the channel estimate associated with interfering source 130 using the channel estimate associated with transmission source 110. For example, receiving device 120 may subtract the expected signal multiplied by the channel estimate associated with the transmission source from the received signal to arrive at a channel estimate for the interfering source. Although interfering source 130 is drawn and described as a single interfering source, interfering source 130 may be any number of interfering sources which may be at various different locations.

Receiving device 120 may compute a covariance matrix $R_v$ which represents the channel estimate associated with interfering source 130 and/or noise. Receiving device 120 may compute an equivalent channel matrix in which the interference and noise become white noise in the received signal model. In particular, the equivalent channel matrix may be computed by multiplying the channel estimate by an inverse square root of the covariance matrix. In some embodiments, receiving device 120 may retrieve a known signal (e.g., a predetermined sounding signal) from memory and modify the retrieved known signal based on the covariance matrix. In some implementations, receiving device 120 may modify (e.g., multiply) the retrieved known signal based on an inverse square root of the covariance matrix. The known signal or predetermined sounding signal may be any set of pilot symbols, training symbols or patterns known to transmission source 110 and receiving device 120 that are used to compute a channel estimate or any other signal that transmission source 110 expects to receive from which to compute a channel estimate. In some implementations, receiving device 120 pre-codes the known signal by the inverse square root of the covariance matrix.

Receiving device 120 may transmit the modified predetermined sounding signal simultaneously using, for example, different antennas 122. For example, receiving device 120 may provide a precoding matrix that corresponds to the inverse square root of the covariance matrix. Receiving device 120 may transmit the predetermined sounding signal from all of antennas 122 with the antenna weights given to each antenna as a corresponding column of the precoding matrix to transmission source 110.

In some embodiments, receiving device 120 may compute the covariance matrix based on the beam received over a forward channel and transmit the predetermined sounding signal to transmission source 110 over a backward channel. In some implementations, the forward channel may be a high-speed or high-capacity link while the backward channel may be a slow-speed or slow-capacity link. In particular, the forward channel and backward channel may be different links used for different purposes (e.g., forward channel used for downlink and backward channel used for uplink). In some implementations, the forward and backward channels may use the same link or the forward and backward channels may use different links having the same characteristics.

Transmission source 110 may modify the shape of beam 150 based on the modified predetermined sounding signal received from receiving device 120 to compensate for any interference (including noise). For example, as discussed in more detail in connection with FIG. 1, transmission source 110 may compute a channel estimate that corresponds to the equivalent channel matrix (that was computed by receiving device 120) based on the modified predetermined sounding signal received from receiving device 120 and the predetermined sounding signal (e.g., stored in a memory of transmission source 110). In particular, transmission source 110 may use any known channel estimate computation techniques to estimate the equivalent channel matrix based on the modified predetermined sounding signal. More specifically, transmission source 120 is "tricked" by receiving device 120 into computing the equivalent channel matrix (which accounts for noise and interference caused by interfering source 130) in the process of transmission source 120 trying to compute the channel estimate of the channel from which the modified sounding signal was received.

In some embodiments, transmission source 110 may use various precoding techniques (e.g., Singular Value Decomposition or Tomlinson-Harahima precoding) to modify characteristics of beam 150 to compensate for interference based on the estimated equivalent channel matrix and channel reciprocity. In some implementations, transmission source 110 may receive the modified predetermined sounding signal over the backward channel. In such circumstances, transmission source 110 may compute the channel estimate of the backward channel based on the received modified predetermined sounding signal (which in turn estimates the equivalent channel matrix) and use channel reciprocity to compute the channel estimate of the forward channel (e.g., using a matrix transpose operation on the backward channel estimate).

Figure 2:
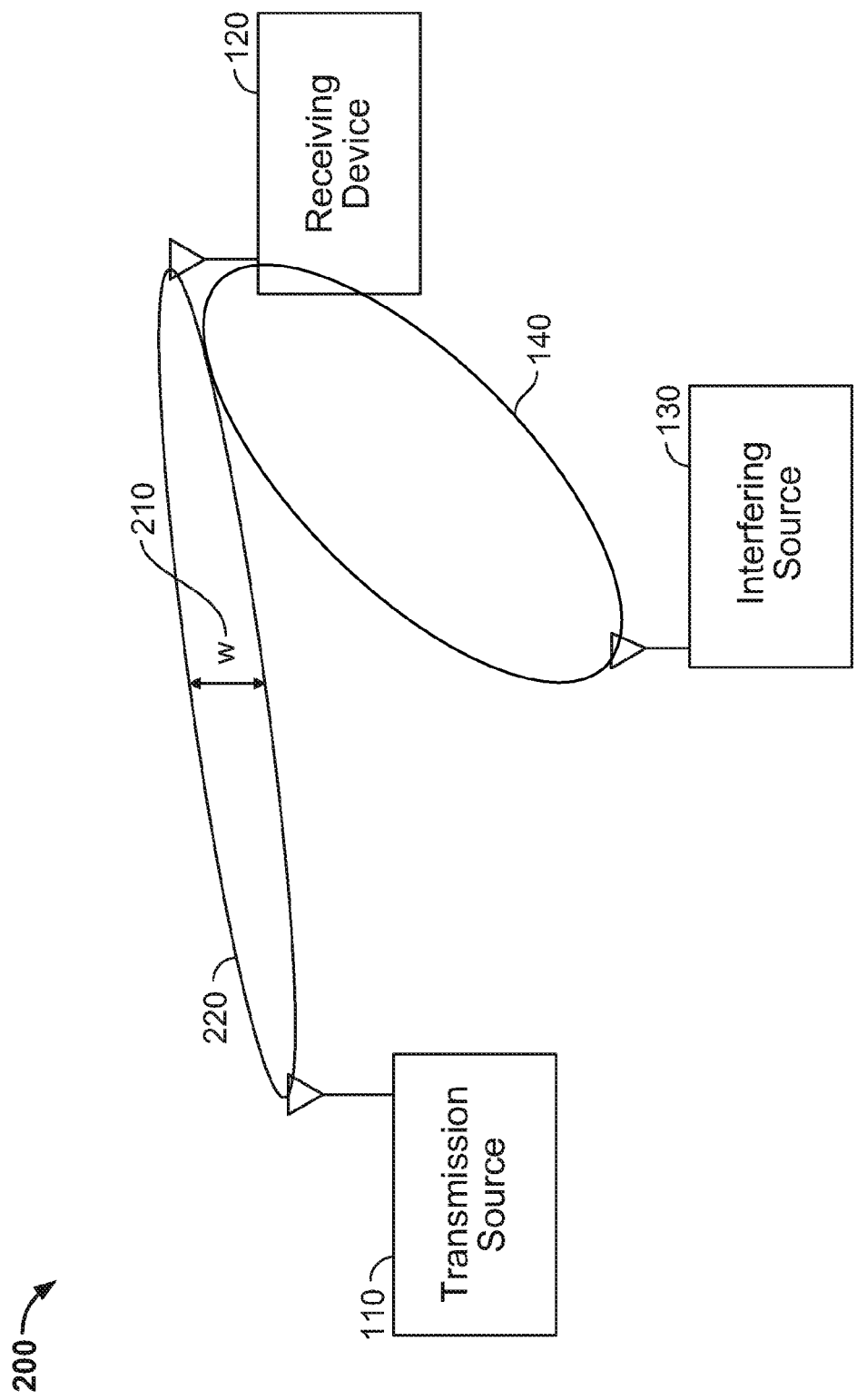

FIG. 2 is a diagram of an illustrative beam-forming system 200 in accordance with an embodiment of the present disclosure. As shown in system 200, transmission source 110 modifies characteristics of beam 150 (FIG. 1) to compensate for interfering sources and transmits a beam 220 directed towards receiving device 120. In particular, characteristics of beam 150 may be modified to reduce width 152. Alternatively, characteristics of beam 150 may be modified to generate the beam with higher power (e.g., higher. SINR) to compensate for interfering beam 140. The beam forming with multiple transmit antennas can be achieved by varying the gain (e.g., magnitude and phase) of each antenna. Varying the antenna gains may affect the direction, width and power of the beam.

For example, transmission source 110 may generate beam 220 with a minor axis width 210 that is smaller than minor axis width 152. Accordingly, there is no overlap or insignificant overlap between interfering beam 140 and beam 220 and thus the SINR of beam 220 is not reduced at receiving device 120.

In some embodiments, receiving device 120 may direct the beam towards transmission source 110. This may be performed using the techniques discussed in connection with transmission source 110. For example, transmission source 110 may similarly, transmit a modified predetermined sounding signal to receiving device 120 that represents a channel estimate and interference associated with signals received by transmission source 110. Receiving device 120 may shape the beam transmitted to transmission source 110 based on the modified predetermined sounding signal to increase power (e.g., SINR) and reliability of the data uplink (e.g., the transmission from mobile device to base station).

Figure 3:
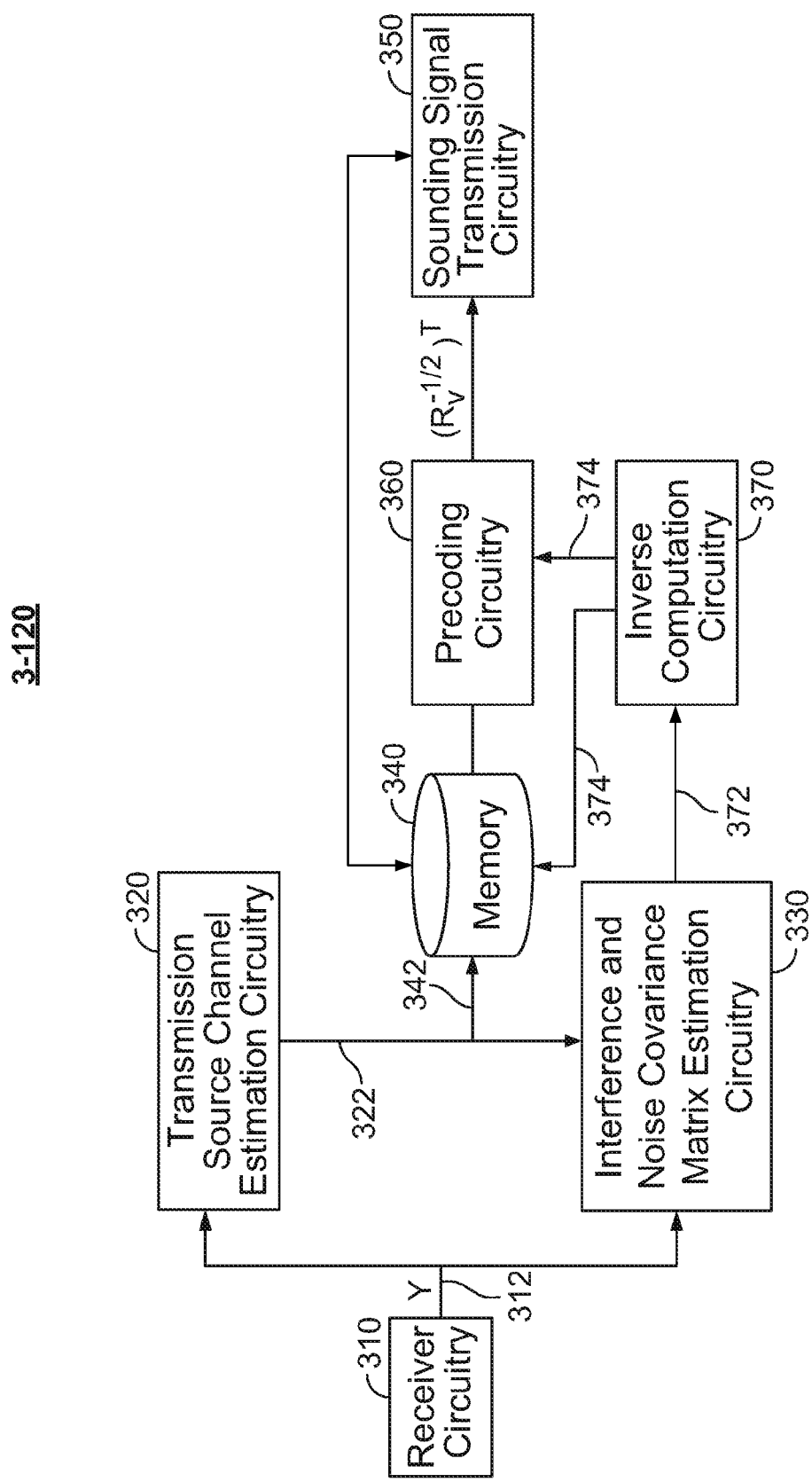
FIG. 3 is a diagram of an illustrative receiving device in accordance with an embodiment of the present disclosure.

FIG. 3 is illustrative of this embodiment of receiving device 3-120 in accordance with the present disclosure. Receiving device 3-120 includes receiver circuitry 310, transmission source channel estimation circuitry 320, interference and noise covariance matrix estimation circuitry 330, memory 340, precoding circuitry 360 and sounding signal transmission circuitry 350. In some implementations, precoding circuitry 360 may be omitted (e.g., when the forward channel and the backward channel use the same link or a link having substantially similar or identical characteristics).

Receiver circuitry 310 may be coupled to one or more antennas 122 (FIG. 1) of receiving device 3-120. Receiver circuitry 310 may include various communication circuitry (not shown) to de-modulate and decode the information received from transmission source 110 through beam 150. For example, the received signal model of receiver 3-120 with N antennas 122, M intended transmission source antennas 112 and L interfering source antennas 132 in a single carrier system may be represented as:

$$y = Hx + Kw + z = Hx + v$$

where $y \in C^{N \times 1}$ and is the vector received by receiver 3-120, and $H \in C^{N \times M}$ is the channel matrix for the intended transmission source 110 signal, $x \in C^{M \times 1}$ is the intended transmit signal vector, $K \in C^{N \times L}$ is the channel matrix for the interfering source 130 signals, $w \in C^{L \times 1}$ is the interfering signal vector, $z \in C^{N \times 1}$ is a noise vector and $v \in C^{N \times 1}$ is the vector that includes interference and noise where C is a complex vector/matrix. This system model may be applied to orthogonal frequency division multiplexing (OFDM) on a per-tone basis (e.g., multiple carrier system where there may be a corresponding received y signal for every carrier).

Receiver circuitry 310 may provide the received signal y 312 which represents beam 150 to transmission source channel estimation circuitry 320 and interference and noise covariance matrix estimation circuitry 330. Transmission source channel estimation circuitry 320 computes the channel matrix H of the channel estimate associated with transmission source 110 from received signal 312. Transmission source channel estimation circuitry 320 may output the raw channel matrix H 322 associated with transmission source 110 to interference and noise covariance matrix estimation circuitry 330 and/or memory 340 for storage. Interference and noise covariance matrix estimation circuitry 330 computes the covariance matrix $R_v$ of the channel estimate associated with interfering source 130 multiplied by an expected value of interfering source and a noise vector from received signal 312. Interference and noise covariance matrix estimation circuitry 330 outputs the covariance channel matrix $R_v$ associated with interfering source 130 and noise to inverse computation circuitry 370.

In some implementations, interference and noise covariance matrix estimation circuitry 330 computes the channel estimate associated with interfering source 130 based on raw channel matrix H 322 received from transmission source channel estimation circuitry 320. In particular, interference and noise covariance matrix estimation circuitry 330 may compute a difference of received signal 312 and raw channel matrix H 322 multiplied by an expected signal x to determine the interfering source channel estimate. For example, channel matrix K associated with interfering source 130 may be computed by combining the channel matrix H 322 with expected values x (which may be retrieved from memory 340) and subtracting the value from received signal y (i.e., Kw+z=y−Hx). K may be derived from Kw by retrieving expected values w from memory 340 and performing a computation on Kw. Computing channel matrix K based on channel matrix H may be more efficient and may speed up the computation of channel matrices H and K. In some embodiments, interfering source 130 may represent multiple interfering sources which may be at different locations and the interference Kw associated with interfering source 130 represents a combined channel estimate associated with each of the multiple interfering sources (e.g., a sum of the channel estimate of each of the interfering sources multiplied by the expected value of the interference source, $$Kw = \sum_{i=1}^{I} K_i w_i,$$

where I is the number of interference source). Noise power may be estimated by subtracting the estimated transmission source power of Hx and the interfering source power of Kw from the total power of the received signal y.

Any suitable channel estimation scheme may be used to compute the channel matrices for H and K. For example, the channel estimation may be performed with or without pilots (e.g., predetermined sounding signal or signal vectors that assist in computing a channel estimate). In particular, when pilots are used, for the estimation of the channel matrix H, the received signal may be represented as y=Hx+z. The intended transmitter may transmit signal vectors $[1\ 0\ 0\ \ldots\ 0]^T$, $[0\ 1\ 0\ \ldots\ 0]^T$, $\ldots$, $[0\ 0\ 0\ \ldots\ 1]^T$ sequentially or in turn. Each column of H may be estimated with a corresponding signal vector in accordance with the received signal equation. After all of the H columns are estimated, computation of the channel matrix H is complete. The estimation of K may be performed in a similar manner.

A communications path 342 may be provided to allow transmission source channel estimation circuitry 320 and interference and noise covariance matrix estimation circuitry 330 to communicate with each other and with memory 340. Memory 340 may be any storage device including a hard disk drive, a CD ROM, EPROM, FPGA, programmable logic device, flash memory, RAM, ROM or any other suitable electronic storage medium.

In some implementations, transmission source channel estimation circuitry 320 and some part of interference and noise covariance matrix estimation circuitry 330 may be implemented using the same component. For example, the component may compute each matrix sequentially. In particular, during a first number of clock cycles, the component may compute the channel matrix of the channel estimate associated with transmission source 110 and during a second number of clock cycles, the component may compute the covariance matrix 372 associated with interfering source 130.

Interference and noise covariance matrix estimation circuitry 330 may compute a covariance matrix $R_v$ 372 which is an estimate of the combined noise and interference vector v. Interference and noise covariance matrix estimation circuitry 330 may compute the covariance matrix $R_v$ 372, directly or indirectly, through the separate estimation of the interfering source channel estimate K and noise component z. In some implementations, interference and noise covariance matrix estimation circuitry 330 may compute sequentially, or in parallel, estimates of channel estimate K and/or noise component z and then compute or generate the covariance matrix $R_v$ 372 from each of the computed estimates of K and z. These estimates may be computed with or without pilots in the manner discussed above with respect to K and H channel matrices or by any other suitable method. Alternatively, as discussed above, interference and noise covariance matrix estimation circuitry 330 may compute the covariance matrix $R_v$ 372 by computing the difference of the received signal y and the transmission channel estimate H combined (e.g., multiplied) with the expected transmitted vector x (e.g., Kw+z=y−Hx).

In some embodiments, interfering source 130 may represent multiple interfering sources which may be at different locations and the covariance matrix $R_v$ 372 represents a combined channel estimate associated with each of the multiple interfering sources and the noise estimate. In particular, v may represent the sum of each of the channel matrices K of each interfering source, multiplied by the expected value of the interference source, and the noise estimate. Covariance matrix $R_v$ 372 may represent the combined noise and channel estimates of the sums of the channel matrices K of the interfering sources, multiplied by the expected value of the interference source.

The covariance matrix $R_v$ 372 may be provided either directly to inverse computation circuitry 370 or stored in memory 340 and subsequently retrieved by inverse computation circuitry 370.

Inverse computation circuitry 370 may compute the square root of the inverse of covariance matrix $R_v$ 372. In particular, inverse computation circuitry 370 may compute a square root of the inverse of covariance matrix $R_v$ 372 to generate inverse covariance matrix $R_v^{-1/2}$ 374. For example, inverse computation circuitry 370 may compute the square root of the inverse of covariance matrix $R_v$ 372 by using methods such as the Cholesky Factorization or any other suitable matrix inverse computation technique.

In some embodiments, receiver 3-120 may compute the equivalent channel matrix $\tilde{H}$ that represents the estimate of the transmission source channel, interference channel and noise by combining (e.g., multiplying) the square root of the inverse covariance matrix $R_v^{-1/2}$ 374 with the channel matrix H 322. In some implementations, the equivalent channel matrix $\tilde{H}$ is computed such that the interference and noise become white. For example, a matrix multiply operation may be performed on the square root of the inverse covariance matrix $R_v^{-1/2}$ 374 and channel matrix H 322 to provide equivalent channel matrix $\tilde{H}$ (e.g., $\tilde{H}=R_v^{-1/2}H$).

In some embodiments, transmission source 110 may communicate with receiving device 3-120 over a forward channel and receiving device may communicate with transmission source 110 over a different backward channel. In such scenarios, inverse covariance matrix $R_v^{-1/2}$ 374 may be provided to precoding circuitry 360 to compute the inverse covariance matrix $R_v^{-1/2}$ corresponding to the backward channel. Precoding circuitry 360 may compute a matrix transpose of inverse covariance matrix $R_v^{-1/2}$ 374. Precoding circuitry 360 may provide the transpose of inverse covariance matrix $R_v^{-1/2}$ 374 (i.e., $[R_v^{-1/2}]^T$) to sounding signal transmission circuitry 350 for transmission to transmission source 110. Reciprocity computation circuitry 360 may store the transpose of inverse covariance matrix $R_v^{-1/2}$ 374 in memory 340. The transpose of inverse covariance matrix $R_v^{-1/2}$ 374 may be provided to sounding signal transmission circuitry 350 in real time by precoding circuitry 360 or may be retrieved from memory 340 by sounding signal transmission circuitry 350 at a later time.

Sounding signal transmission circuitry 350 may modify data associated with a predetermined sounding signal based on the transpose of inverse covariance matrix $R_v^{-1/2}$ 374 for transmission to transmission source 110 using one or more antennas 122 (FIG. 1). For example, sounding signal transmission circuitry 350 may retrieve the data associated with the predetermined sounding signal from memory 340 and modify the data associated with the predetermined sounding signal based on the transpose of inverse covariance matrix $R_v^{-1/2}$ 374 or the output of precoding circuitry 360. Sounding signal transmission circuitry 350 may transmit the data associated with the modified predetermined sounding signal to transmission source 110 instead of the predetermined sounding signal stored in memory 340.

Sounding signal transmission circuitry 350 may transmit the predetermined sounding signal stored in memory 340 from all of antennas 122 with antenna weights given as each column of the precoding matrix. In particular, each of antennas 122 may transmit the same predetermined sounding signal using different weights corresponding to a given column of the precoding matrix. In some implementations, all of the columns of precoding matrix have non-zero values. This may be performed instead of transmitting the predetermined sounding signal from each of antennas 122 in turn. In some implementations, sounding signal transmission circuitry 350 may transmit the modified predetermined sounding signal over the backward channel to transmission source 110.

As discussed in further detail below in connection with FIG. 5, transmission source 110 computes a channel estimate of the forward channel that compensates for interference caused by interfering source 130 (e.g., estimate the equivalent channel matrix) based on the received modified predetermined sounding signal. The modified predetermined sounding signal received over the backward channel represents $(HR_v^{-1/2})^T$ when receiving device 3-120 computes the precoding matrix for the backward channel-based on the beam received over the forward channel. In particular, transmission source 110 may compute a backward channel estimate based on the modified predetermined sounding signal (e.g., estimate the equivalent channel matrix corresponding to the backward channel $\tilde{H}_b^T$) and using channel reciprocity determine the forward channel estimate (e.g., estimate the equivalent channel matrix corresponding to the forward channel $\tilde{H}$).

Transmission source 110 may perform precoding based on the estimated forward channel equivalent channel matrix $\tilde{H}$ (e.g., using Singular Value Decomposition or Tomlinson-Harashima precoding). For example, beam 220 (FIG. 2) may be generated based on the equivalent channel matrix for the forward channel estimated from the modified predetermined sounding signal received from receiver 3-120. Beam 220 may be generated to compensate for interference caused by interfering source 130 and may be received by receiving device 3-120 in accordance with the following received signal model:

$$y=R_v^{-1/2}y=R_v^{-1/2}H+R_v^{-1/2}v=\tilde{H}x+n$$

where the covariance matrix $R_n$ of n ($R_v^{-1/2}v$) is the identity matrix equivalent to white noise.

In some implementations, an inverse covariance matrix that is associated with less than all of the interfering sources (e.g., partial interference compensation) may be computed. In such implementations, the transmission source may modify the beam to compensate for only those interfering sources that are associated with the inverse covariance matrix. A predetermined sounding signal may be modified based on the inverse covariance matrix representing less than all of the interfering sources and transmitted to the transmission source using any of the techniques discussed above.

For example, in the scenario where there is one transmission source and two interfering sources and noise, the received signal model may be represented by the following equation:

$$y = Hx + \sum_{i=1}^{2} K_i w_i + z$$

where H is the channel estimate associated with the transmission source, x is the expected transmitted symbol, $K_i$ is the channel estimate associated with interfering source i, $w_i$ is the expected interference symbol of interfering source i, and z is a noise component. In the scenario, where partial compensation for interfering sources is provided, the combined noise and partial interference vector (e.g., interference channel estimate associated with one of the two interfering sources) may be represented by vector v (i.e., $v=K_2w_2+z$). The square root of the inverse of covariance matrix $R_v^{-1/2}$ may be combined with the channel estimate H and the channel estimate $K_1$ associated with the first interfering source to provide two equivalent channel matrices (e.g., $\tilde{H}=R_v^{-1/2}H$ and $\tilde{K}_1=R_v^{-1/2}K_1$).

The predetermined sounding signal may be modified based on the common term of the square root of the covariance matrix $R_v^{1/2}$ and transmitted to transmission source 110. Transmission source 110 may compute a channel estimate using the received modified predetermined sounding signal and the known or predetermined sounding signal that estimates the equivalent channel matrices as discussed above and below. Transmission source 110 may provide precoding based on the computed channel estimate that compensates for at least the interference caused by one of the two interfering sources. In particular, the equivalent received signal model of the modified beam may be represented as:

$$\tilde{y}=R_v^{-1/2}y=\tilde{H}x+\tilde{K}_1w_1+n.$$

Figure 4:
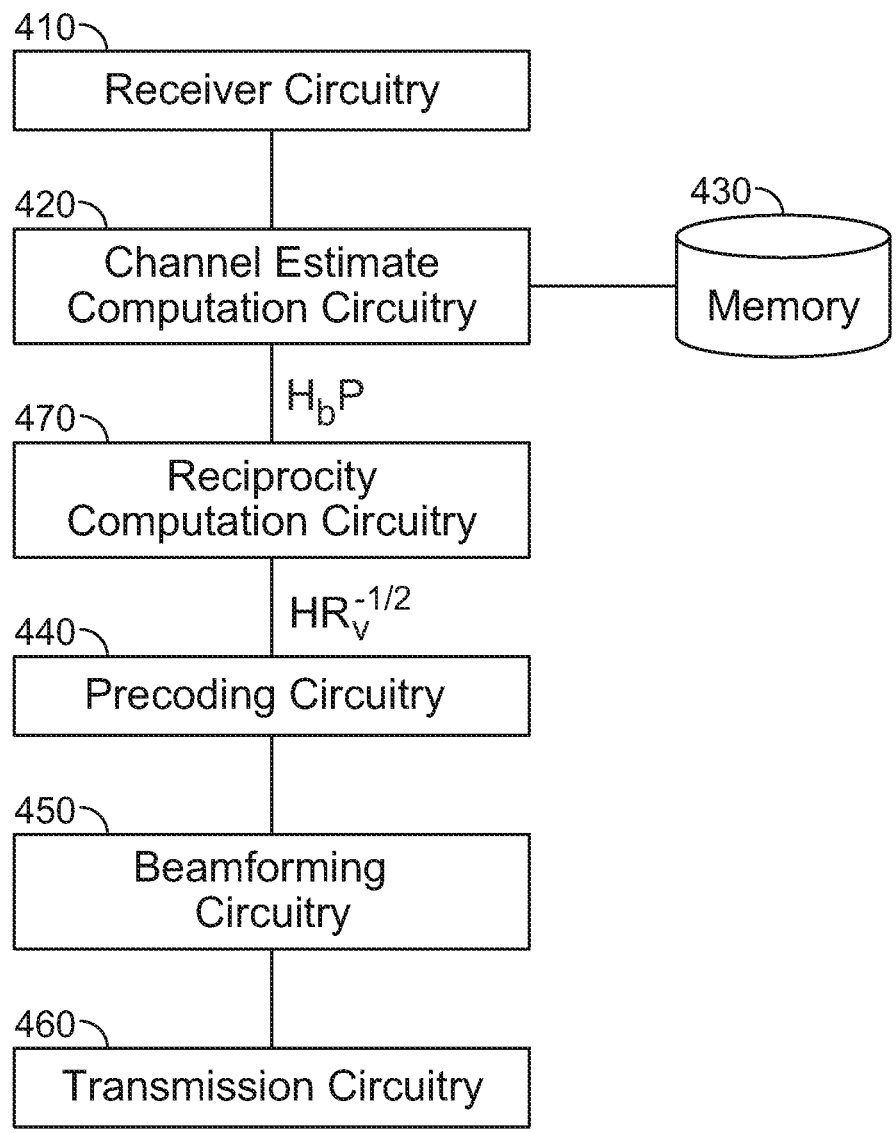
FIG. 4 is a diagram of an illustrative transmission source in accordance with an embodiment of the present disclosure.

FIG. 4 is a diagram of an illustrative transmission source 4-110 in accordance with an embodiment of the present disclosure. Transmission source 4-110 includes receiver circuitry 410, channel estimate computation unit 420, reciprocity computation circuitry 470, a memory 430, precoding circuitry 440, beam forming circuitry 450 and transmission circuitry 460. Transmission source 4-110 corresponds to transmission source 110 (FIGS. 1 and 2).

Receiver circuitry 410 may be coupled to one or more antennas 112 (FIG. 1) of transmission source 4-110. Receiver circuitry 410 may include various communication circuitry (not shown) to de-modulate and decode the information (e.g., the data associated with the modified predetermined sounding signal $P=(R_v^{-1/2})^T$) transmitted by and received from receiving device 120. In some implementations, receiver circuitry 410 may share circuitry used for uplink in a base station or transmission source. Receiver circuitry 410 may be used to receive signals transmitted by receiving device over the forward channel and/or in the backward channel.

In some embodiments, channel estimate computation circuitry 420 receives the modified predetermined sounding signal from receiver circuitry 410. Channel estimate computation circuitry 420 performs any of the techniques discussed above to compute a channel estimate of the communications channel (e.g., forward channel or backward channel) over which the modified predetermined sounding signal was transmitted by receiving device 120. For example, when the modified predetermined sounding signal is transmitted by receiving device 120 over the backward channel, channel estimate computation circuitry 420 computes a channel estimate $\tilde{H}_b$ of the backward channel based on the modified predetermined sounding signal and the expected predetermined sounding signal. In particular, channel estimate computation circuitry 420 may retrieve from memory 430 the known predetermined sounding signal and based on the received signal model, $y=\tilde{H}x+n$, compute an estimate of $\tilde{H}$, the channel estimate. More specifically, x may be the expected predetermined sounding signal and y is the received modified predetermined sounding signal and n is noise. Accordingly, $y/x=\tilde{H}$ may be used to determined the channel estimate of the backward channel.

Transmission source 110 "thinks" that the channel estimate being computed by channel estimate computation circuitry 420 is an unmodified channel estimate but because receiving device 120 changed the predetermined sounding signal, transmission source 110 is actually computing a skewed version of the channel estimate which accounts for interfering sources and/or noise. More specifically, the traditional hardware and software in the transmission source 110 compensates for interfering sources affecting the beam received by receiving device 120 without being changed in system 100. In particular, receiving device 120 performs all the computations necessary and transmits the modified sounding signal to transmission source 110 which, in turn, performs traditional computations and determines a channel estimate for the backward and forward channels without any additional work than traditional systems. That is, receiving device 120 modified the predetermined sounding signal in accordance with $P=(R_v^{-1/2})^T$ thereby causing transmission source 110 (e.g., channel estimate computation circuitry 420) to compute a channel estimate for the backward channel in accordance with $\tilde{H}_b=H_bP=H_b(R_v^{-1/2})^T$.

Channel estimate computation circuitry 420 may provide the channel estimate for the backward channel to reciprocity computation circuitry 470. Reciprocity computation circuitry 470 may determine or derive the channel estimate for the forward channel based on channel reciprocity techniques and the backward channel estimate. In particular, reciprocity computation circuitry 470 may compute a matrix transpose of the backward channel estimate (e.g., $\tilde{H}_b^T$) received from channel estimate computation circuitry 420. More specifically, the matrix transpose of the backward channel estimate $\tilde{H}_b$ corresponds to the forward channel estimate $\tilde{H}$. Accordingly, the forward channel estimate is computed by transmission source 4-110 in accordance with $\tilde{H}=\tilde{H}_b^T=(H_bP)^T=(H_b(R_v^{-1/2})^T)^T=R_v^{-1/2}H_b^T=R_v^{-1/2}H$. That is, transmission source 4-110 determines the channel estimate for the forward channel that compensates for any interfering source 130 and/or noise (e.g., an estimate of the forward channel equivalent matrix) based on the covariance matrix without receiving from receiving device 120 any matrices (e.g., without receiving the covariance matrix, forward/backward channel matrix, or equivalent channel matrix).

In some implementations, when the forward channel and backward channel communications are the same, reciprocity computation circuitry 470 may be omitted. In particular, the channel estimate computed by channel estimate computation circuitry 420 (e.g., the estimated equivalent channel matrix) corresponds to both the forward channel and the backward channel and can be provided directly to precoding circuitry 440. In some embodiments, the forward channel and the backward channel between transmission source 110 and receiving device 120 may need to be calibrated for the reciprocity computations (discussed above and below) to be performed by receiving device 3-120 and/or transmission source 4-110. The forward and backward channels may need to be calibrated when the transmission and reception radio frequency (RF) responses between antennas and baseband processor at the transmission source 110 and/or receiving device 120 are different.

Precoding circuitry 440 may be configured by transmission source 4-110 with precoding information corresponding to the estimated equivalent channel matrix for the forward channel derived from the channel estimate computed by channel estimate computation unit 420. Precoding circuitry 440 may perform a Singular Value Decomposition (SVD) algorithm, a Tomlinson-Harashima Precoding algorithm, or any other suitable linear or non-linear precoding algorithm (e.g., unitary matched-filter precoding algorithm, zero-forcing precoding algorithm, or Dirty paper coding (DPC) coding algorithm) to shape the beam to compensate for interference present at receiving device 3-120. In particular, precoding circuitry 440 may adjust the weighting of each antenna when transmitting multiple streams of the signals through one or more antennas 112 that shape the beam to compensate for the interference. For example, to perform SVD decomposition, precoding circuitry 440 may shape the beam in accordance with H=USV*, where the channel feedback is H, U and V are unitary matrices and S is a diagonal matrix. The transmit signal vector x may be generated by computing x=Vd, where d is the data signal vector. Then, Hx (i.e., the transmission channel estimate multiplied by the transmitted signal) (Hx=USV*(Vd)) becomes USd since V is a unitary matrix. The receiver may perform linear equalization with U. In that case, U*y=U*Hx+U*n=U*USV*Vd+U*n=Sd+U*n, where y is the received signal and n is noise. Because S is a diagonal matrix, there is no interference among the desired streams of d.

Beam forming circuitry 450 may use information provided by precoding circuitry 440 to modify one or more characteristics of the transmitted beam 150 (FIG. 1). For example, beam forming circuitry 450 may change a phase, frequency, power or amplitude of the transmitted beam to compensate for interference. The changed beam 220 (FIG. 2) may be more accurately pointed towards receiving device 3-120.

Transmission circuitry 460 may be coupled to one or more antennas 112 (FIG. 1). Transmission circuitry 460 may modulate and encode the data vector x which may be retrieved from memory 430 and transmit the data vector x in a beam with characteristics provided by beam forming circuitry 450. In some implementations, transmission circuitry 460 may share circuitry used for downlink in a base station or transmission source.

FIG. 5 illustrates a process 500 for directing a beam towards a receiving device in the presence of interference based on channel reciprocity in accordance with an embodiment of the present disclosure. At 510, a beam transmitted by a transmission source is received at a receiving device. The received beam is affected by an interference signal from an interfering source. For example, beam 150 is transmitted by transmission source 110 (FIG. 1). The intended shape of beam 150 is affected by an interference signal (e.g., beam 140) transmitted by interfering source 130. Transmission source 110 may be a serving base station of a receiving device 120 and interfering source 130 may be another base station that is closer or further away from receiving device 120. The interfering beam 140 overlaps with beam 150 over region 160. The resulting beam (e.g., the beam 150 affected by interfering beam 140) is received by receiving device 120.

At 520, a covariance matrix that represents a channel estimate associated with the interfering source is computed at the receiving device. For example, inverse computation circuitry 370 computes covariance matrix 374 based on the interfering source channel estimate received from interference and noise covariance matrix estimation circuitry 330 (FIG. 3).

At 530, a predetermined sounding signal is modified at the receiving device based on the covariance matrix for transmission to the transmission source. For example, sounding signal transmission circuitry 350 receives the inverse covariance matrix (or transpose of the inverse covariance matrix) and computes a precoding matrix based on the inverse covariance matrix. Sounding signal transmission circuitry 350 may retrieve a predetermined sounding signal from memory 340 and modifies the retrieved predetermined sounding signal based on the precoding matrix.

At 540, the transmission source is caused to estimate an equivalent channel matrix based on the predetermined sounding signal and the modified predetermined sounding signal. The equivalent channel matrix represents the channel estimate associated with the interfering source and a channel estimate associated with the transmission source. For example, channel estimate computation circuitry 420 computes a channel estimate based on the modified predetermined sounding signal received from receiving device 120 (FIGS. 1 and 4). The computed channel estimate corresponds to the equivalent channel matrix since receiving device 120 changed properties of the predetermined sounding signal based on a covariance matrix to cause a channel estimate computed based on the changed predetermined sounding signal to correspond to the equivalent channel matrix. When the transmission source attempts computes a channel estimate for the channel over which the transmission source receives the modified predetermined sounding signal, the transmission source actually computes the channel estimate for the channel affected by the interfering source as perceived by the receiving device (e.g., the equivalent channel matrix).

The foregoing describes methods and apparatus for directing a beam towards a receiving device (e.g., beam-forming) in the presence of interference. The above described embodiments of the present disclosure are presented for the purposes of illustration and not of limitation. Furthermore, the present disclosure is not limited to a particular implementation. For example, one or more steps of methods described above may be performed in a different order (or concurrently) and still achieve desirable results. In addition, the disclosure may be implemented in hardware, such as on an application specific integrated circuit (ASIC) or on a field-programmable gate array (FPGA). The disclosure may also be implemented in software.

What is claimed is:

1. A method for directing a beam towards a receiving device, the method comprising:
   receiving, at the receiving device, the beam transmitted by a transmission source, the received beam being affected by an interference signal from an interfering source;
   computing, at the receiving device, a covariance matrix that represents a channel estimate associated with the interfering source;
   modifying, at the receiving device, a predetermined sounding signal by multiplying the predetermined sounding signal by a precoding matrix corresponding to a square root of an inverse of the covariance matrix, wherein the multiplying comprises using each of one or more antennas of the receiving device to apply a weight to the predetermined sounding signal, the weights corresponding to different columns of the precoding matrix;
   using the one or more antennas of the receiving device to transmit the modified predetermined sounding signal to the transmission source; and
   causing the transmission source to estimate an equivalent channel matrix based on (i) the predetermined sounding signal and (ii) the modified predetermined sounding signal, wherein the equivalent channel matrix represents (i) the channel estimate associated with the interfering source and (ii) a channel estimate associated with the transmission source.

2. The method of claim 1, wherein the estimated equivalent channel matrix corresponds to the channel matrix associated with the transmission source multiplied by a square root of an inverse of the covariance matrix.

3. The method of claim 1, wherein the estimated equivalent channel matrix causes interference caused by the interference signal to become white noise.

4. The method of claim 1, wherein the predetermined sounding signal is known to the transmission source and the receiving device, and wherein modifying a predetermined sounding signal comprises precoding data associated with the predetermined sounding signal by multiplying the predetermined sounding signal by a square root of an inverse of the covariance matrix.

5. The method of claim 4, wherein each of the precoding matrix columns is non-zero, and wherein the predetermined sounding signal is transmitted by the one or more antennas substantially simultaneously.

6. The method of claim 1 further comprising:
transmitting, to the transmission source, the modified predetermined sounding signal through a backward channel;
wherein the equivalent channel matrix estimated by the transmission source is associated with the backward channel and is estimated based on (i) the modified predetermined sounding signal received through the backward channel and (ii) the predetermined sounding signal.

7. The method of claim 6, wherein:
computing, at the receiving device, the covariance matrix comprises:
computing a covariance matrix for the forward channel based on a forward channel estimate associated with the interfering source; and
computing a precoding matrix for the predetermined sounding signal;
modifying the predetermined sounding signal based on the covariance matrix comprises modifying the predetermined sounding signal based on the precoding matrix; and
causing the transmission source to estimate the equivalent channel matrix comprises causing the transmission source to compute an equivalent channel matrix for the forward channel based on reciprocity of the equivalent channel matrix associated with the backward channel.

8. The method of claim 1, wherein the transmission source modifies characteristics of the beam by precoding data based on the equivalent channel matrix estimated by the transmission source.

9. The method of claim 1, wherein the transmission source estimates the equivalent channel matrix without receiving any channel matrix from the receiving device.

10. A system for directing a beam towards a receiving device, the system comprising:
a receiver configured to receive, at the receiving device, the beam transmitted by a transmission source, the received beam being affected by an interference signal from an interfering source; and
control circuitry configured to:
compute, at the receiving device, a covariance matrix that represents a channel estimate associated with the interfering source;
modify, at the receiving device, a predetermined sounding signal by multiplying the predetermined sounding signal by a precoding matrix corresponding to a square root of an inverse of the covariance matrix, wherein the multiplying comprises using each of one or more antennas of the receiving device to apply a weight to the predetermined sounding signal, the weights corresponding to different columns of the precoding matrix;
use the one or more antennas of the receiving device to transmit the modified predetermined sounding signal to the transmission source; and
cause the transmission source to estimate an equivalent channel matrix based on (i) the predetermined sounding signal and (ii) the modified predetermined sounding signal, wherein the equivalent channel matrix represents (i) the channel estimate associated with the interfering source and (ii) a channel estimate associated with the transmission source.

11. The system of claim 10, wherein the estimated equivalent channel matrix corresponds to the channel matrix associated with the transmission source multiplied by a square root of an inverse of the covariance matrix.

12. The system of claim 10, wherein the estimated equivalent channel matrix causes interference caused by the interference signal to become white noise.

13. The system of claim 10, wherein the predetermined sounding signal is known to the transmission source and the receiving device, and wherein the control circuitry is further configured to pre-code data associated with the predetermined sounding signal by multiplying the predetermined sounding signal by a square root of an inverse of the covariance matrix.

14. The system of claim 13, wherein each of the precoding matrix columns is non-zero, and wherein the predetermined sounding signal is transmitted by the one or more antennas substantially simultaneously.

15. The system of claim 10, wherein the control circuitry is further configured to:
transmit, to the transmission source, the modified predetermined sounding signal through a backward channel;
wherein the equivalent channel matrix estimated by the transmission source is associated with the backward channel and is estimated based on (i) the modified predetermined sounding signal received through the backward channel and (ii) the predetermined sounding signal.

16. The system of claim 15, wherein the control circuitry is further configured to:
compute a covariance matrix for the forward channel based on a forward channel estimate associated with the interfering source;
compute a precoding matrix for the predetermined sounding signal;
modify the predetermined sounding signal based on the precoding matrix; and
cause the transmission source to compute an equivalent channel matrix for the forward channel based on reciprocity of the backward channel equivalent channel matrix.

17. The system of claim 10, wherein the transmission source modifies characteristics of the beam by precoding data based on the equivalent channel matrix estimated by the transmission source.

18. The system of claim 10, wherein the transmission source estimates the equivalent channel matrix without receiving any channel matrix from the receiving device.

* * * * *